(12) United States Patent
Seaton et al.

(10) Patent No.: US 9,318,919 B2
(45) Date of Patent: Apr. 19, 2016

(54) POWER DISTRIBUTION WITH WRAPAROUND BUS

(75) Inventors: Scott Thomas Seaton, Kirkland, WA (US); Allan Joseph Wenzel, Seattle, WA (US); Steven Ray Steinert, Monroe, WA (US); Courtney Shepherd Jones, Hobart, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 909 days.

(21) Appl. No.: 13/530,651

(22) Filed: Jun. 22, 2012

(65) Prior Publication Data
US 2013/0342012 A1 Dec. 26, 2013

(51) Int. Cl.
*H02J 3/00* (2006.01)
*H02J 9/08* (2006.01)
*H02J 3/38* (2006.01)
*H02J 3/46* (2006.01)
*H02J 9/06* (2006.01)

(52) U.S. Cl.
CPC . *H02J 9/08* (2013.01); *H02J 3/006* (2013.01); *H02J 3/38* (2013.01); *H02J 3/46* (2013.01); *H02J 9/062* (2013.01); *Y10T 307/305* (2015.04)

(58) Field of Classification Search
CPC ............... H02J 3/006; H02J 3/38; H02J 3/46
USPC ............................................. 307/19–21, 29
See application file for complete search history.

(56) References Cited

U.S. PATENT DOCUMENTS

| | | | | |
|---|---|---|---|---|
| 3,555,290 A * | 1/1971 | Ellermeyer | | 307/65 |
| 5,642,002 A * | 6/1997 | Mekanik et al. | | 307/64 |
| 6,191,500 B1 * | 2/2001 | Toy | | 307/64 |
| 6,304,006 B1 * | 10/2001 | Jungreis | | 307/64 |
| 6,630,752 B2 * | 10/2003 | Fleming et al. | | 307/64 |
| 7,005,760 B2 * | 2/2006 | Eaton et al. | | 307/65 |
| 7,459,803 B2 * | 12/2008 | Mosman | | 307/64 |
| 7,560,831 B2 | 7/2009 | Whitted | | |
| 8,110,946 B2 * | 2/2012 | Morishima | | 307/64 |
| 8,212,401 B2 * | 7/2012 | Linkhart et al. | | 307/64 |
| 8,294,297 B2 * | 10/2012 | Linkhart et al. | | 307/64 |
| 8,471,659 B1 * | 6/2013 | Flegel | | 335/255 |

(Continued)

OTHER PUBLICATIONS

McCarthy, et al. "Comparing UPS System Design Configuration", Retrieved Date: Feb. 22, 2012 pp. 1-27, http://www.apcmedia.com/salestools/SADE-5TPL8X_R3_EN.pdf.

(Continued)

*Primary Examiner* — Adi Amrany
(74) *Attorney, Agent, or Firm* — Henry Gabeyjelski; Kate Drakos; Micky Minhas

(57) ABSTRACT

A power distribution system among a set of units (e.g., server blocks) may comprise, for each unit, a utility line and a unit generator, and a reserve generator providing failover transient performance and redundancy improvement to the power for the unit generators. The reserve generator may connect to the units via a reserve bus, and the unit generators may selectively connect to a wraparound bus connected to the reserve bus. When the failover load exceeds the available failover transient capability of one generator, one or more unit generators may (automatically or by operator selection) be connected with the wraparound bus to apply available transient capability to satisfy the excess failover load with minimal increase in power distribution resources and complexity.

20 Claims, 7 Drawing Sheets

(56) References Cited

U.S. PATENT DOCUMENTS

| | | | |
|---|---|---|---|
| 8,788,109 B2* | 7/2014 | Weir et al. | 700/295 |
| 2002/0084697 A1* | 7/2002 | Radusewicz | 307/64 |
| 2003/0042794 A1* | 3/2003 | Jarrett, Jr. | 307/23 |
| 2003/0062775 A1* | 4/2003 | Sinha | 307/68 |
| 2003/0117761 A1* | 6/2003 | Pebles et al. | 361/111 |
| 2004/0169422 A1* | 9/2004 | Eaton et al. | 307/64 |
| 2005/0012395 A1* | 1/2005 | Eckroad et al. | 307/44 |
| 2005/0200205 A1* | 9/2005 | Winn et al. | 307/64 |
| 2006/0220462 A1* | 10/2006 | O'Leary | 307/44 |
| 2008/0080104 A1* | 4/2008 | Yagudayev et al. | 361/20 |
| 2010/0225167 A1* | 9/2010 | Stair et al. | 307/29 |
| 2011/0173465 A1 | 7/2011 | Akers | |
| 2012/0181869 A1* | 7/2012 | Chapel et al. | 307/64 |

OTHER PUBLICATIONS

Herbener, Frank. "Isolated-Parallel UPS Configuration", Retrieved Date: Feb. 22, 2012 pp. 1-15, http://www.piller.dk/Isolated-Parallel_UPS_Configuration.pdf.

Homburg, Karl A. "Short-Circuit, Coordination, and Arc-Flash Studies for Data Centers: Best Practices and Pitfalls", Published Date: Jun. 1, 2010 pp. 1-20, http://www.missioncriticalmagazine.com/ext/resources/MC/Home/Files/PDFs/WP_Square_D-Homburg_ShortCircuitCoord-ArcFlashStudies.pdf.

Katz, Alan. "Powering an Internet Data Center", Retrieved Date: Feb. 22, 2012 pp. 1-4, http://powerquality.ecmweb.com/mag/power_powering_internet_data/.

"Techconnect Sweet UPS Service", Retrieved Date: Feb. 23, 2012, pp. 1-7, http://www.techconnect.biz/redundancy.html.

* cited by examiner

POWER DISTRIBUTION WITH WRAPAROUND BUS

BACKGROUND

In the field of computing, many scenarios involve a distribution of power from a generator set to a set of units, such as a set of computer workstations or servers. In many such scenarios, the power distribution system may include one or more batteries that store energy during the ordinary provision of power from the utility line, and then release the energy as power during a failure of the utility line. Additionally, power may be provided to the units from a utility line, but in the event of a failure of power supply via the utility line, one or more generators may be utilized to convert a fuel supply into auxiliary power. These and other techniques may be utilized to provide power not only during periods of complete cessation of power from the utility line (e.g., due to a physical severing of the utility line or a failure of a regional electric plant), but also to supplement an inadequate provision of power from the utility line during a brownout, and/or to condition provided power during periods of inconsistency (e.g., maintaining steady current and cycle in the event of fluctuations or surges in the power provided by the utility line).

In addition, many such scenarios include failover mechanisms for redistributing power in the event of a failure of one or more components. For example, in the event that a generator fails or is taken offline for maintenance, a reserve generator may be utilized to provide power for one or more units if power supply from the utility line also fails. Such power redistribution may be achieved by a human operator who monitors the conditions of the generator set and selects generators to re-route power in place of one or more failed generators. Alternatively, the control mechanism for power redistribution may be automated, e.g., by monitoring the conditions of each power supply, and in the event of a failure of a generator, may rapidly re-route power through a reserve generator. These and other techniques may be used to achieve the distribution of power with failover capabilities to alleviate failures in the utility line and/or components of the power distribution system.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the inclusion of reserve components within a power distribution system may provide failover capabilities for primary components, it may be appreciated that such distribution may inadequately utilize existing power resources. For example, a generator set may include one reserve generator, but a failover event may cause reliance upon the reserve generator while it has been taken offline for maintenance; the reserve generator may also fail during a failover event; or the failover may involve more load than the reserve generator may provide. In these scenarios, the power distribution system fails and causes at least some units to experience diminished power or loss of power. However, other units may have unit generators that are operating below capacity or at zero capacity, and that may otherwise bear the excess load that the reserve generator fails to handle; but unless not tied into the reserve power distribution, these unit generators may be inaccessible to apply the available capacity to the spare load. Many alternative techniques may address this inefficiency by providing additional failover units (e.g., more than one reserve generator) or complicated power re-routing systems that may add significant cost and/or complexity to the power distribution system.

Presented herein are techniques for achieving a distribution of power within a generator set in a manner that enables existing components to provide failover capacity. In such scenarios, a reserve generator may be connected with the units through a reserve bus, and respective units may include a reserve switch that taps into the power provided by the reserve generator when primary power sources for the unit (e.g., the utility line, the unit generator, and/or local batteries) fail. In accordance with the techniques presented herein, a wraparound bus may be connected with the reserve bus and selectively connected with respective unit generators. This power distribution architecture thus enables the application of available transient performance improvements needed to handle excess failover load with minimal additional cost and complexity.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
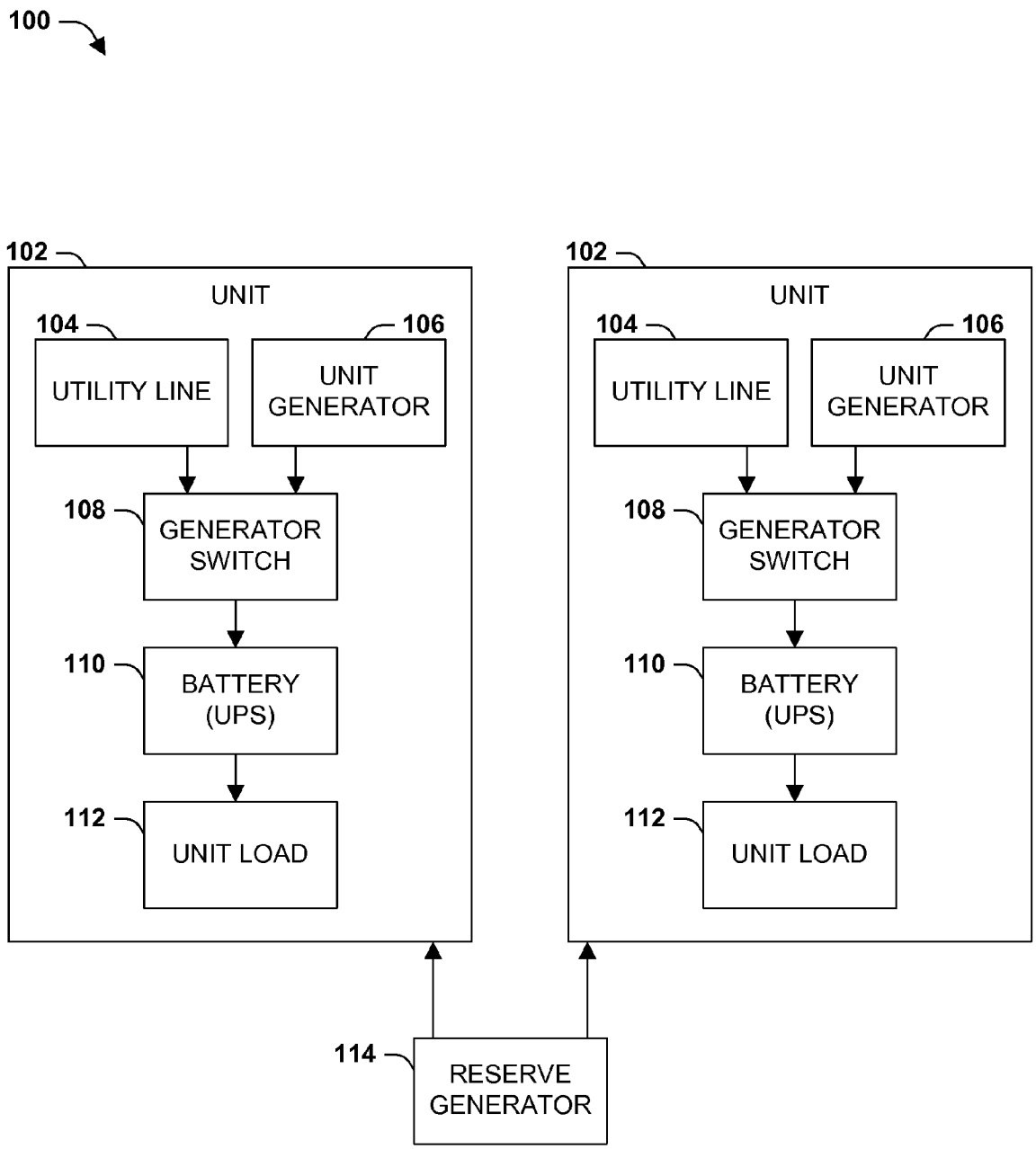
FIG. 1 is an illustration of an exemplary scenario featuring a generator set providing power distribution for a set of units.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a power distribution network configured to provide power to a set of units, such as a set of server blocks in a large-scale server facility. In these scenarios, respective unit may be connected with a utility line that provides power from a utility source and one or more generators that, in the event of a failure of the utility source (e.g., a blackout, a brownout, or a power surge), activate to generate power from a fuel supply. The units may also include a battery, such as an uninterruptible power supply, that provides power to the unit during transitions between power sources, and/or power conditioning resources that absorb power with fluctuating properties (e.g., inconsistent current or availability) and provide power with stable properties to more sensitive components within the unit (e.g., computing resources that may fail if supplied with fluctuating power).

In such scenarios, the distribution of power among the generators and the units may include failover capacity wherein, in the event of a failure of power resources for a unit, load from the unit may be transferred to reserve power sources. While many architectures may provide such failover capacity, achieving such failover capabilities with rapidity, reliability, flexibility, and cost-efficiency may present a significant challenge in the architecture of power distribution systems.

FIG. 1 presents an illustration of a first exemplary scenario 100 featuring one technique for providing failover capacity in a power distribution system. In this first exemplary scenario 100, a set of units 102 respectively comprising a unit load 112 (e.g., a set of servers). The unit loads 112 of respective units 102 may ordinarily receive power from a utility line 104. In the event of a failure, diminished capacity, or undesirable fluctuations in the capacity provided by the utility line 104, the unit 102 may activate a unit generator 106 that generates power from a fuel supply (e.g., a diesel power generator). For example, the unit 102 may provide a generator switch 108 that (automatically or through operator selection) selects the utility line 104 when power capacity from the utility line 104 is sufficient and stable, and otherwise switches to the unit generator 106. Additionally, the unit 102 may present a battery 110, such as an uninterruptible power supply, positioned between the generator switch 108 and the unit load 112. The battery 110 may store a modest supply of power that is replenished when power is provided by the components attached to the generator switch 108, and that is supplied to the unit load 112 when power is not provided by the generator switch 108 (e.g., providing bridge power while the unit generator 106 is starting up after a detected failure of the utility line 104). The battery 110 may also absorb and stabilize fluctuations in the availability and/or properties of the power provided by the generator switch 108, rather than conveying such fluctuations to sensitive components within the unit load 112. Additionally, a reserve generator 114 may be connected with each unit 102 to provide failover capacity in the event for the unit load 112 in the event of a failure of power components within the unit 102. As a first example, a protracted failure of the utility line 104 may deplete both the unit generator 106 and the battery 110, and the reserve generator 114 may enable the supply of reserve power to the unit 102. As a second example, a failure of the generator switch 108, battery 110, power cabling, or other components within the unit 102 may interrupt the delivery of power from the utility line 104 and/or the unit generator 106, and the reserve generator 114 may supply reserve power to the unit 102 until such failures are corrected. In this manner, the reserve generator 114 may provide "N+1" failover capacity for the units 102 as part of the (N-sized) generator set.

However, the architecture presented in the first exemplary scenario 100 of FIG. 1 also presents some deficiencies. As a first example, a failover event of one or more units 102 may arise while the reserve generator 114 is offline (e.g., during maintenance or testing). As a second example, during a failover event, the reserve generator 114 may also fail (e.g., experiencing an additional mechanical failure or a depletion of fuel). As a third example, in the event of failover of multiple units 102 in a large unit array, the reserve load created by the unit loads 112 demanding reserve power may exceed the available reserve capacity of the reserve generator 114. In these scenarios, the reserve generator 114 may be unable to supply adequate reserve power to the unit loads 112, causing a loss of power or diminished power that may cause the unit loads 112 to fail. Moreover, in such scenarios, this unit load failure may arise even if some unit generators 106 have available capacity. For example, a first unit 102 may fail over to the reserve generator 114 and the reserve generator may fail to provide adequate power, but a second unit 102 may comprise a unit generator 106 having capacity exceeding the unit load 112 of the second unit 102. The failure of power to the unit load 112 of the first unit 102 may have been alleviated by the spare capacity of the second unit generator 106, but this may be unachievable in the power distribution architecture in this first exemplary scenario 100.

Figure 2:
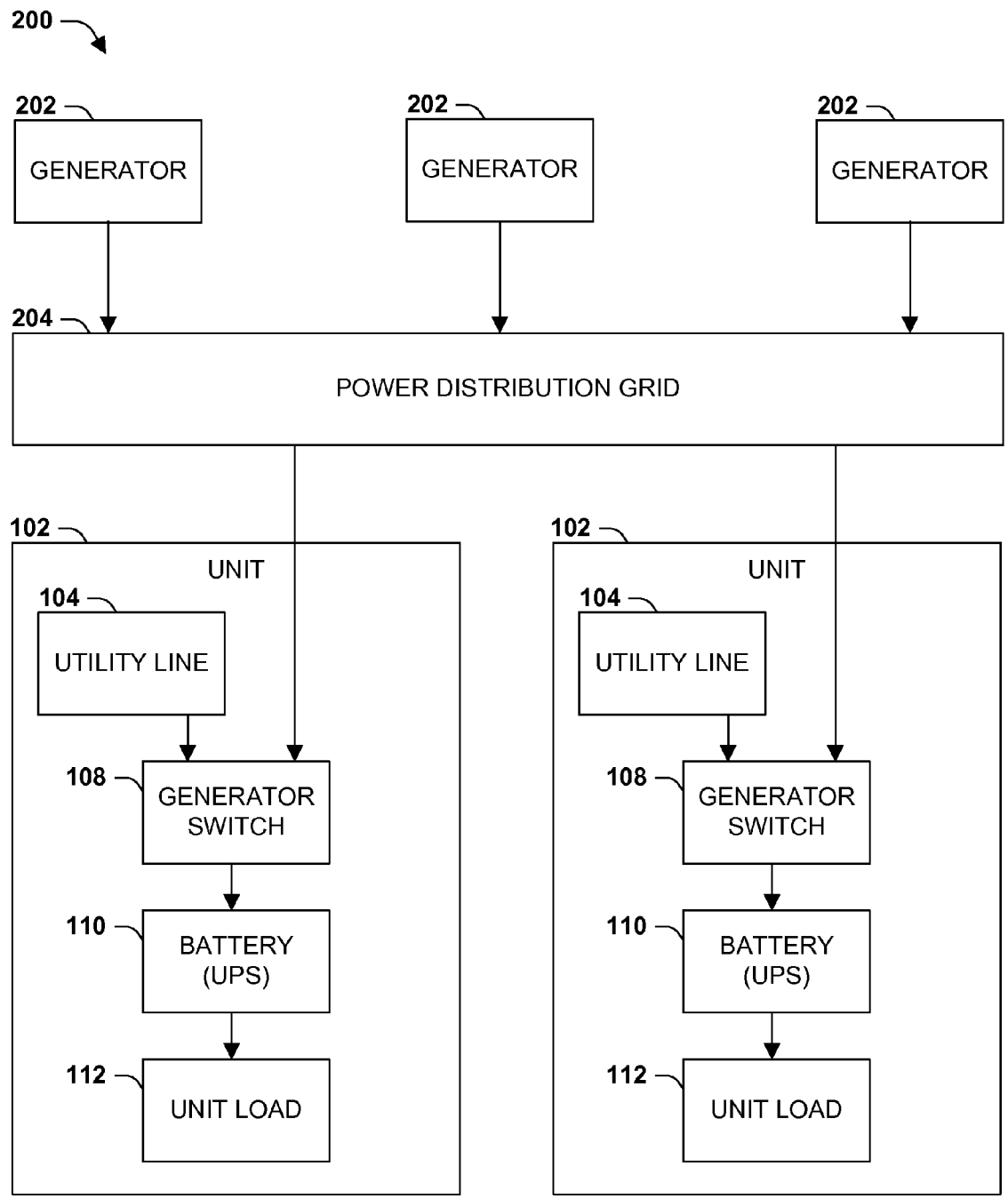
FIG. 2 is an illustration of another exemplary scenario featuring a generator set providing power distribution for a set of units.

Alternative techniques may provide such alternative power distribution capabilities, but with added expense, complexity, and/or additional vulnerabilities. FIG. 2 presents a second exemplary scenario 200 wherein, rather than coupling unit generators 106 with respective units 102, a set of generators 202 may feed into a power distribution grid 204 that distributes power to all of the units 102. While the decoupling of generators 202 and units 106 may alleviate some of the inefficiencies in the first exemplary scenario 100, this architecture may present other inefficiencies. As a first example, the comprehensive configuration of the power distribution grid 204 may present significant complexity and costs. As a second example, the power distribution grid 204 may represent an additional point of failure, and it may be difficult to service the power distribution grid 204 without compromising the provision of power from the generators 202 for all units 102. As a third example, decoupling of the generators 202 from the units 102 may impose physical distance between the generators 202 and the units 102, thus increasing inefficient power transfer and reducing the modularity of the units 102. These and other inefficiencies may arise from power distribution architectures such as those presented in the exemplary scenarios of FIGS. 1 and 2.

B. Presented Techniques

Presented herein are power distribution techniques that provide architectures featuring failover capacities that enable existing power resources to provide failover power capacity for other units in a flexible and controllable manner, while reducing the added cost and complexity of the architecture. In such scenarios, if the reserve generator 114 may be connected with the units 102 via a reserve bus, the unit generators 106 of respective units 102 may be selectively connected to a wraparound bus that is connected to the reserve bus. Such selective coupling Improves the transient performance and redundancy of the generator system such that if the reserve UPS is offline the load can be powered directly from generators.

Figure 3:
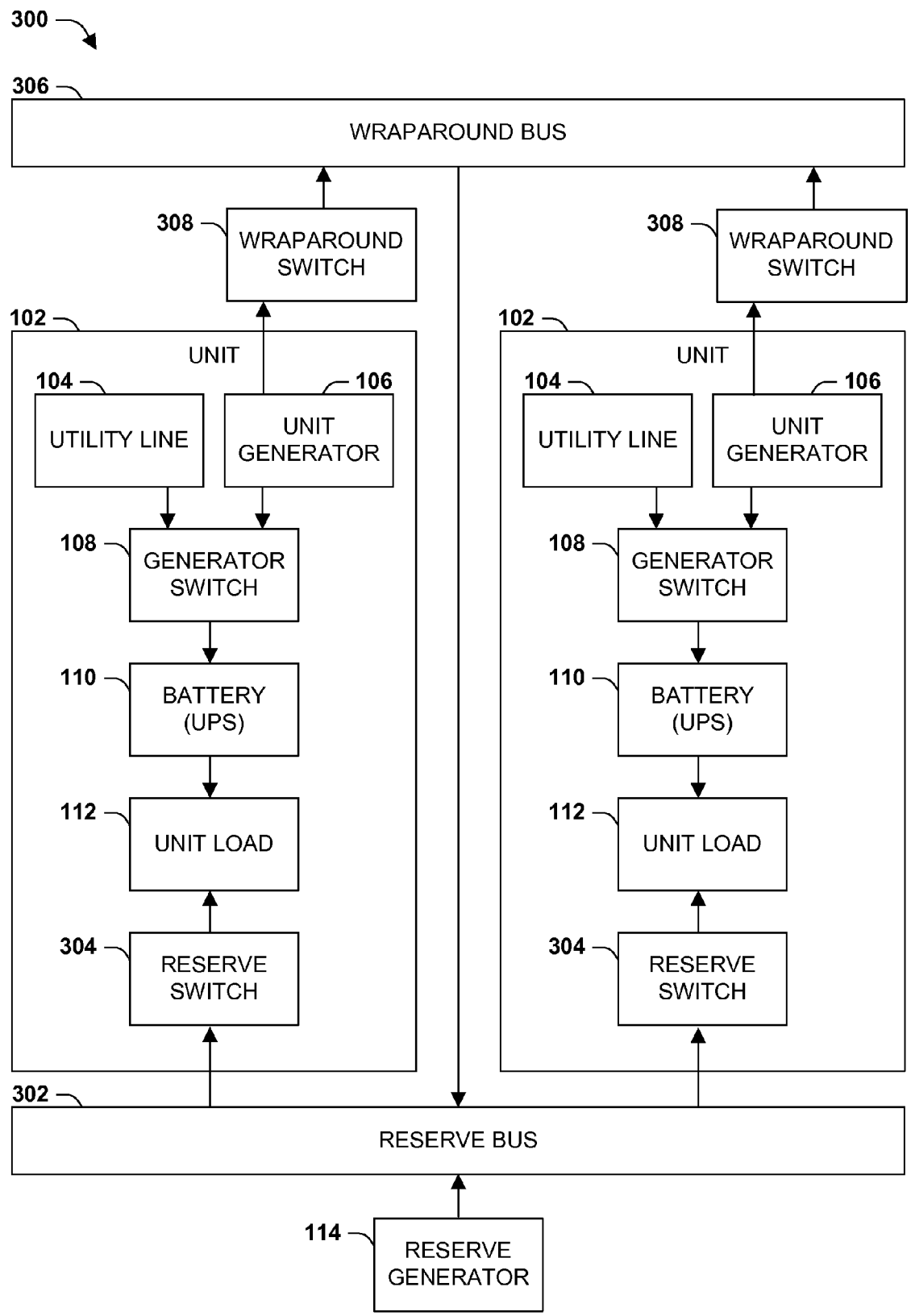
FIG. 3 is an illustration of an exemplary scenario featuring a generator set providing power distribution for a set of units in accordance with the techniques presented herein.

FIG. 3 presents an illustration of an exemplary scenario 300 featuring a power distribution architecture configured according to the techniques presented herein. In this exemplary scenario 300, respective units 102 comprise a unit load 112 supplied with power from a utility line 104 and a unit generator 106, which are coupled with the unit load 114 through a generator switch 108 and a battery 110. Additionally, respective units 102 comprise a reserve switch 304 that is connected with a reserve bus 302 to which the reserve generator 114 is connected. The reserve generator 114 may be activated to provide all of the reserve capacity to the reserve bus 302, and any unit 102 may, upon detecting inadequate power supply through the generator switch 108, activate the reserve switch 304 to access the reserve capacity of the reserve bus 302. In addition, respective unit generators 106 are connected via a wraparound switch 308 to a wraparound bus 306 that is further connected to the reserve bus 302, and may provide spare capacity to the reserve bus 302 through the wraparound bus 306 upon closing the wraparound switch 308. Upon detecting a reserve load placed on the reserve bus 302 that approaches or exceeds the reserve capacity of the reserve generator 114, the power distribution system may (automatically or through operator selection) activate the wraparound switches 308 for one or more unit generators 106 having spare capacity, thus supplementing the reserve to improve the transient performance and redundancy of the reserve bus 302 to meet the reserve load. In this manner, the architecture in the exemplary scenario 300 enables unit generators 106 to supplement the reserve transient performance and redundancy of the reserve generator 114 in a comparatively efficient manner, with minimal increase in power resources and power distribution complexity, in accordance with the techniques presented herein.

C. Exemplary Embodiments

The techniques presented herein may be implemented in various types of embodiments. The exemplary scenario 300 of FIG. 3 presents a first such embodiment, wherein power is provided to at least two units 102 by a generator set comprising a reserve generator 114; a reserve bus 302 connecting respective units 102 to the reserve generator 114; for respective units 102, a utility line 104, a unit generator 106, a generator switch 108 configured to route power from the utility line 104 and/or the unit generator 106; and a reserve switch 304 configured to route power from the generator switch and/or the reserve bus 302; and a wraparound bus 302 selectively connecting respective unit generators 106 to the reserve bus 302.

Figure 4:
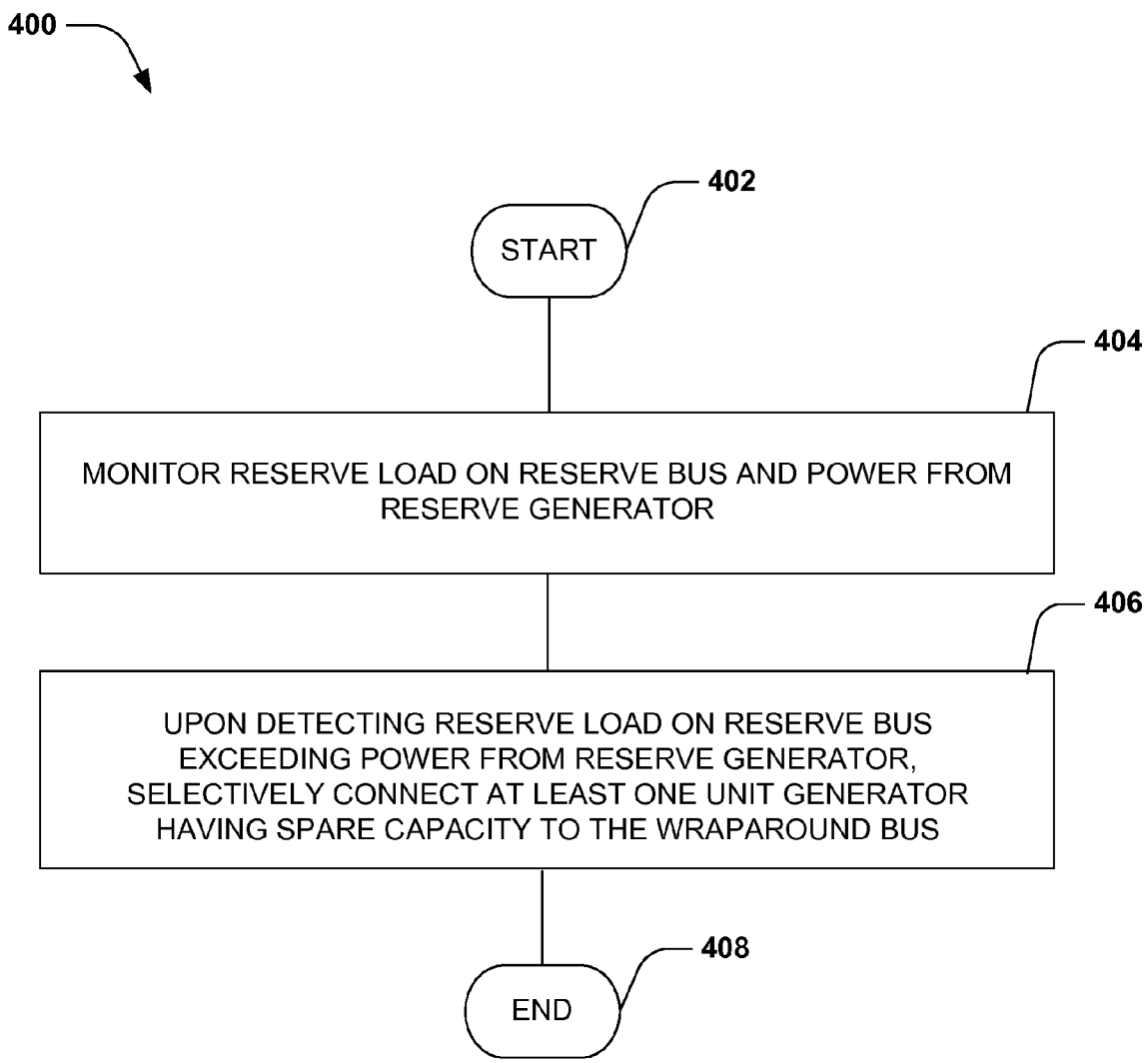
FIG. 4 is a flow chart illustrating an exemplary method of configuring a generator set to provide power distribution for a set of units in accordance with the techniques presented herein.

FIG. 4 presents a second exemplary embodiment of the techniques presented herein, illustrated as an exemplary method 400 of providing power from a generator set to a set of units 102. The exemplary method 400 may be utilized with architectures including a reserve generator 114; a reserve bus 302 connecting respective units 102 to the reserve generator 114; for respective units 102, a utility line 104, a unit generator 106, and a reserve switch 304 configured to route power from the utility line 104, the unit generator 106, and the reserve bus 302; and a wraparound bus 306 selectively connecting respective unit generators 106 to the reserve bus 302 through a wraparound switch 308. In such architectures, the techniques presented herein may be applied as the exemplary method 400 of FIG. 4, which begins at 402 and comprises monitoring 404 a reserve load on the reserve bus 302 and power from the reserve generator 114, and when the reserve UPS is offline the transient performance and redundancy reserve bus 302 can be improved by paralleling other generators to the reserve generator 114, selectively connecting 406 at least one unit generator 106 to the wraparound bus 306 (e.g., by activating the wraparound switch 308 for the unit generator 106). Having achieved a power distribution according to the techniques presented herein, the exemplary method 400 ends at 408.

Another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
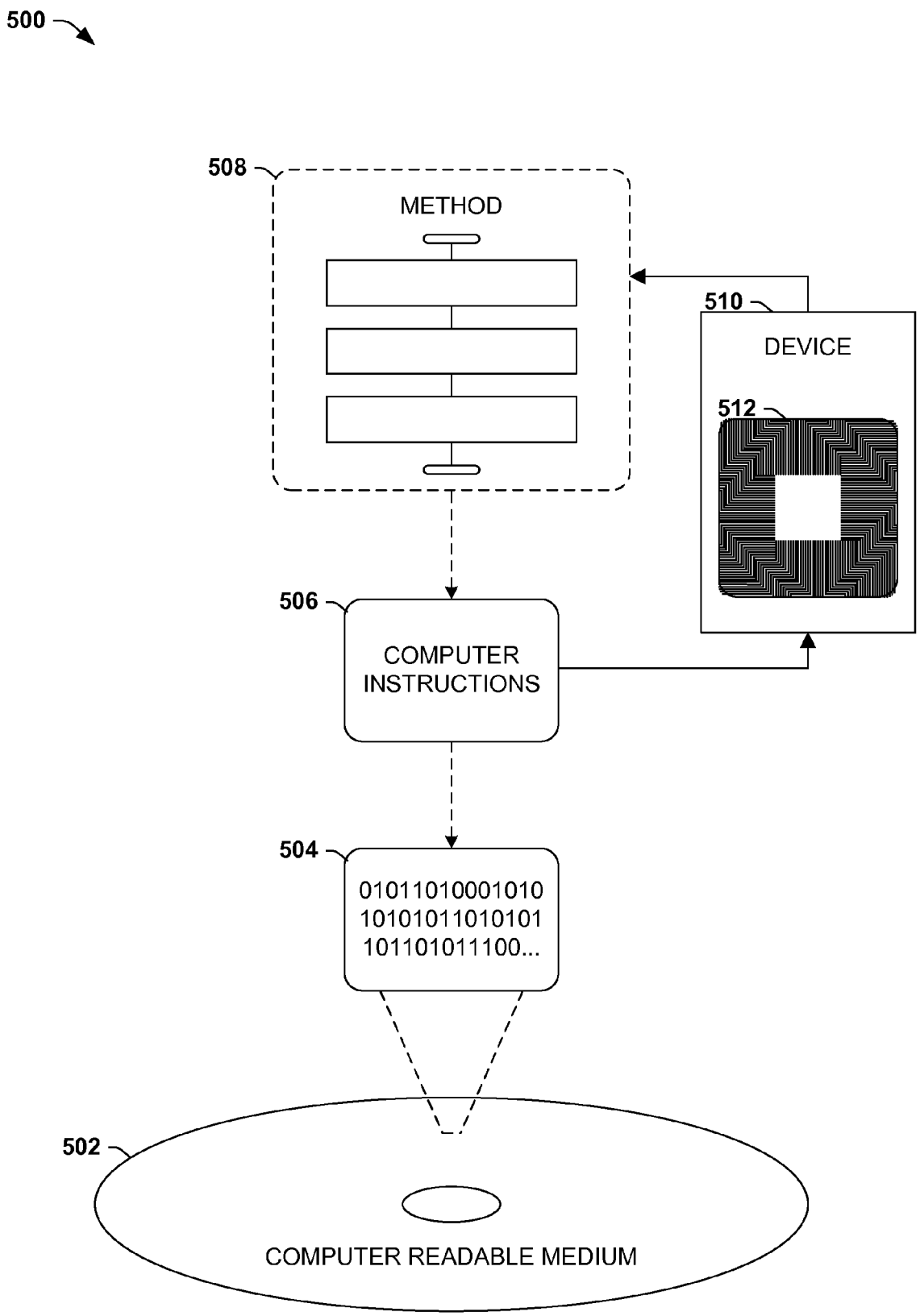
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable storage device 502 (e.g., a CD-R, DVD-R, or a platter of a hard disk drive), on which is encoded computer-readable data 504. This computer-readable data 404 in turn comprises a set of computer instructions 506 configured to operate according to the principles set forth herein. Some embodiments of this computer-readable medium may comprise a nontransitory computer-readable storage medium (e.g., a hard disk drive, an optical disc, or a flash memory device) that is configured to store processor-executable instructions configured in this manner that, when executed on a processor 512 of a device 510, cause the device to perform the techniques presented herein. For example, the processor-executable instructions 506 may be configured to cause the device 510 to perform a method of presenting search results in response to a search query, such as the exemplary method 400 of FIG. 4. Many such computer-readable storage devices 502 may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4 and/or the exemplary computer-readable storage device 502 of FIG. 5) to confer individual and/or synergistic advantages upon such embodiments.

As a first variation of the techniques presented herein, the components within the units 102 may be designed in view of the reserve bus 302 and/or wraparound bus 306. As a first such example, respective unit generators 106 may be selected for the power distribution architecture that are capable of providing power to the wraparound bus 306 with a step load of at least one additional unit 102 (e.g., each unit generator 106 may be selected to provide sufficient capacity for both the unit load 112 of the unit 102 and the unit load 112 of a second unit 102 that may fail over to the reserve bus 302), thus providing a one-to-one correspondence between failing units 102 and unit generators 106 connecting to the wraparound bus 306. As a second example, respective units 102 may comprise a battery 110 (e.g., an uninterruptible power supply) connecting the generator switch 108 and the reserve switch 304. As a first such example, the reserve switch 304 may be configured to connect the unit 102 to the reserve bus 302 only after the battery 110 is exhausted. As a second such example, the battery 110 may also replenish from the reserve bus 302. As a third such example, the battery 110 may also stabilize fluctuations in the reserve bus 302 to provide stable power to the unit load 112. As a third such example, respective units 102 may comprise one or more air handling units (e.g., airflow, temperature, and/or humidity regulators) that adjust air flow within the unit 102 to provide climate regulation. Where respective units comprising a battery 110 receiving power from the generator switch 108, the units 102 may comprise a primary air handling unit that is connected to the battery 110 and/or reserve switch 304, and an auxiliary air handling unit that is connected to the generator switch 108 but not connected to the battery 110 and/or reserve switch 304. This configuration may enable some air handling units to continue providing minimal air flow regulation in the event of a failure of the utility line 104, unit generator 106, and/or generator switch 108, while other air handling units are automatically shut down to conserve power drain during the failure.

As a second variation of the techniques presented herein, where respective unit generators 106 are connected with the wraparound bus 306 via a wraparound switch 308, a wraparound controller may be provided and configured to activate the wraparound switch 308 for at least one unit generator 106 to supplement the power on the reserve bus 302. As a first example, the wraparound controller may comprise an operator panel featuring at least one operator switch that, when toggled by an operator, activates the wraparound switch 308 for at least one unit generator 106. An operator may therefore monitor the reserve UPS and upon failure choose to utilize the wraparound bus 306 to supply additional transient performance and redundancy to the reserve bus 302. As a second example, the wraparound controller may comprise at least one reserve bus monitor that is configured to detect a reserve UPS failure on the reserve bus 302 that results in no UPS protection from the reserve generator 114, and an automated wraparound controller that is configured to, upon the reserve bus monitor detecting the reserve insufficiency, activate the wraparound switch 308 for at least one unit generator 106. The automated wraparound controller may therefore provide automated failover utilizing the spare capacities of the unit generators 106 according to a fixed or programmable logic. This logic may utilize various considerations while enabling such failover activation of the wraparound bus 306; e.g., if respective unit generators 106 have a maximum load, an automated wraparound controller may be configured to activate the wraparound switches 308 for respective unit generators 106 within the maximum loads of the unit generators 106 for the reserve bus 306.

As a third variation of the techniques presented herein, the generator set may include a load bank that supplies an additional, variable load on the reserve bus 302 and/or the wraparound bus 306 (e.g., a set of resistors that may be selectively activated to achieve a desired additional load on the power distribution). The inclusion of a load bank may be advantageous for various reasons. As a first example, respective unit generators 106 may have a minimum load, below which undesired effects may arise. For example, an underutilized unit generator 106 may fail to consume all provided liquid fuel, and unused liquid fuel may be emitted as part of the exhaust, creating an undesirable "wet stack" effect presenting exhaust contamination and/or resource corrosion. Adjusting the variable load of the load bank to meet the minimum load of the unit generator 106 may enable the complete consumption of fuel and the avoidance of wet stacking. As a second example, where the generator set is designed to provide fault tolerance for a specified number of unit failures of unit generators 106 (e.g., fault tolerance for the failover of three units 102), the variable load of the load bank may be adjusted to apply a load on the reserve bus 302 equivalent to that of the maximum failover units 102. Such added load may be advantageous, e.g., for simulating the maximum failover load for testing. Alternatively, by adjusting the load bank to a variable load not greater than the loads of the specified number of current unit failures (e.g., reducing the variable load as units failover to the reserve bus 302, and/or upon detecting a connection of at least one unit generator 106 to the wraparound bus 306), the variable load of the load bank may maintain a consistent load on the reserve bus 302.

Figure 6:
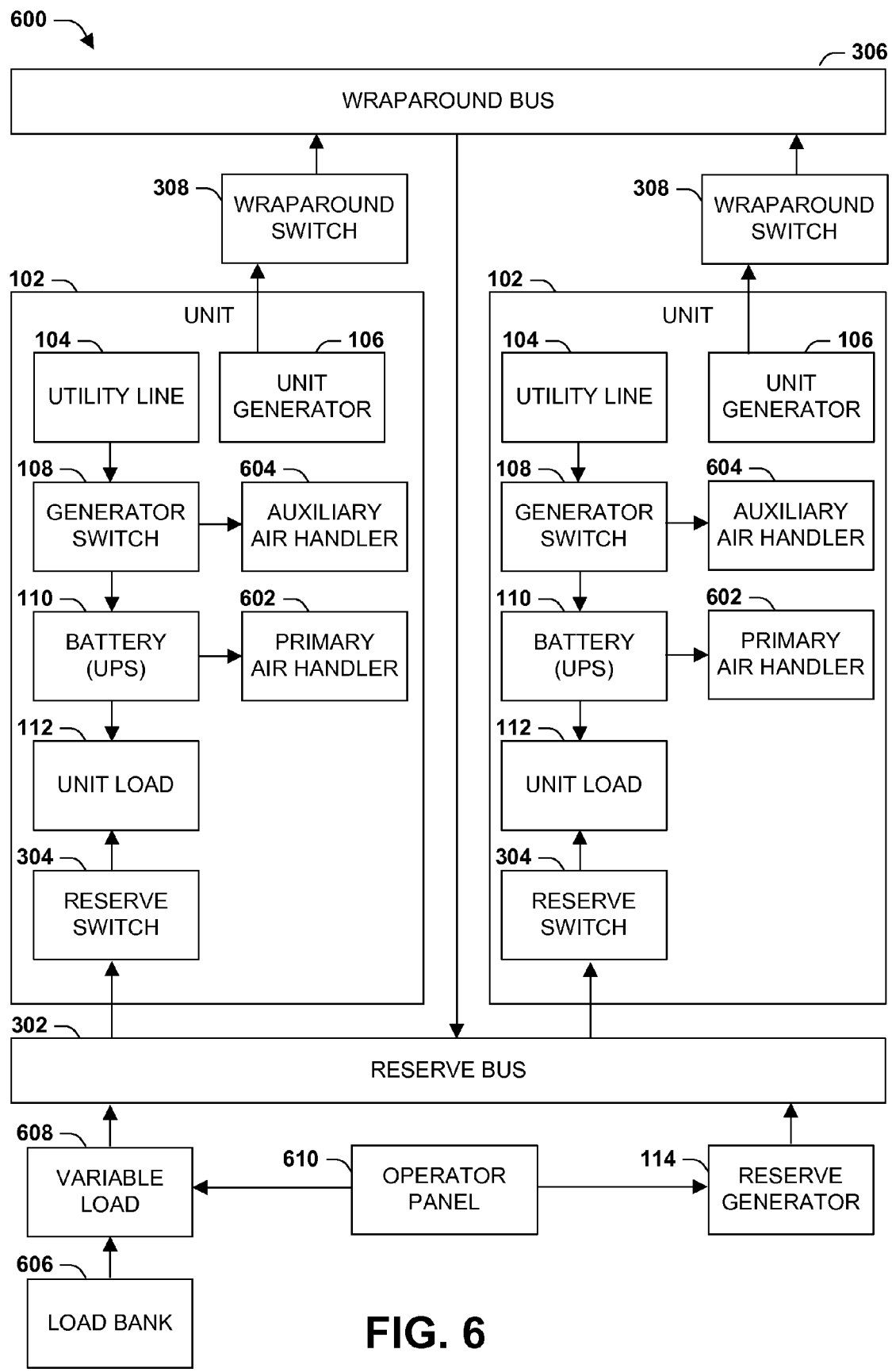
FIG. 6 is an illustration of an exemplary scenario featuring a generator set providing power distribution for a set of units incorporating a set of air handlers and a load bank operable via a power distribution panel.

FIG. 6 presents an illustration of an exemplary scenario 600 featuring several of the variations presented herein. In this exemplary scenario 600, respective units 102, comprising a unit load 112 supplied by a utility line 104 and a unit generator 106 through a generator switch 108, and connecting with a reserve bus 302 through a reserve switch 304 that is supplied by a reserve generator 114, and where respective unit generators 106 are selectively connected to a wraparound bus 306 via a selective wraparound switch 308 in accordance with the techniques presented herein. As a first such variation, respective units 102 comprise a primary air handler 602 that is connected to the battery 110 and/or reserve switch 304 and that provides minimal climate regulation as long as the battery 110 and/or reserve switch 304 is supplying power to the unit load 112, and an auxiliary air handler 604 that is only connected to the generator switch 108 and that provides additional climate regulation only during ordinary power supply. As a second such variation, a load bank 606 provides variable load 608 to the reserve bus 302 (e.g., to simulate failover, reduce wet stacking, and/or maintain consistent load on the reserve bus 302 despite fluctuating failover). As a third such variation, the reserve generator 114, wraparound switches 308, and variable load 608 of the load bank 606 may be controlled by an operator via an operator panel 610, which may present the measurements of various detectors to indicate the state of the generator set and operator control of such components to enable adjustment of the generator set by the operator. In this manner, the exemplary scenario 600 of FIG. 6 presents enables additional features through the incorporation of several variations of the techniques presented herein.

E. Exemplary Scenario

The following narrative presents an exemplary scenario featuring an embodiment of these techniques that combines several of the variations presented herein, and will be described in the context of a hypothetical scenario featuring four units 102 of the type illustrated in the exemplary scenario 600 of FIG. 6.

The operation of the power distribution system may begin with all four units 102 operating from the utility line 104. Accordingly, the generator switches 108 may select the utility line 104 for the unit loads 112; the unit generators 106 may be deactivated to conserve fuel, or may be operating in a low-powered mode for faster availability; the batteries 110 may be charging or fully charged from the utility line 104; and the reserve switches 304 and wraparound switches 308 may be opened. The reserve generator 114 may also be deactivated; may be operating in a low-power mode; or, for rapid availability, may be operating in a full-power mode, with the variable load 608 of the load bank 606 adjusted to satisfy a minimum load of the reserve generator 114 (e.g., to reduce wet-stacking).

A failure of the utility line 104 may cause, in each unit 102, an automated transition of the generator switch 108 and an activation of the unit generator 106. The batteries 110 in each unit 102 may power the unit load 112 during a brief startup activation of the unit generator 106. Each unit 102 may therefore automatically switch to single-generator mode, and the reserve generator 114 may remain unutilized by either unit 102.

If the unit generator 106 for the first unit 102 also fails, the first unit 102 may begin operating from the battery 110 (including a primary air handler 602 connected to the battery 110, but not including an auxiliary air handler 604 connected to the generator switch 108). If the battery 110 is inoperative or is depleted, the reserve switch 304 may activate to transfer the load of the first unit 102 to the reserve generator 114 via the reserve bus 302. This transfer may fully utilize the capacity of the reserve generator 114 to maintain power to the first unit 102.

In the event of a similar failure of a unit generator 106 and depletion of the battery 110 for a second unit 102, the reserve switch 304 for the second unit 102 may also transfer its load to the reserve bus 302. In architectures that fail to implement the techniques presented herein, the concurrent transfer of the unit loads of the first two units 102 may exceed the transient performance capability of the reserve generator 114, causing inadequate or fluctuating reserve power to each unit 102, or a complete failure of the reserve generator 114. Alternatively, in the event of the failure of the first unit generator 106 while the reserve generator 114 is offline (e.g., during maintenance or testing), reserve power may be unavailable even for continued operation of just the first unit 102.

However, in architectures utilizing the techniques presented herein, an operator may activate the wraparound switches for either or both of the third and fourth units 102. This activation enables the third and/or fourth unit generators 106 to provide power through the wraparound bus 306 to the reserve bus 302 (e.g., parallel generator operation mode), thus supplementing the inadequate capacity of the reserve generator 114 and/or providing reserve power despite the absence of the reserve generator 114.

The application of these techniques in this scenario thus provides several advantages. As a first example, the availability of the wraparound bus 306 enables the supplementing of the transient performance and redundancy of the reserve generator 114 to handle unit loads 112 transferred from other units 102. As a second example, the wraparound bus may enable compensation for unavailability of the reserve generator 114 and/or batteries 110 in uninterruptible power supplies during a failover. As a third example, this supplementing and compensating is achieved using existing resources (e.g., unit generators 106 having available capacity) rather than acquiring and maintaining additional reserve generators 114. Moreover, supplementing the reserve transient performance and redundancy through parallel generator operation may present greater capabilities for maintaining the voltage and frequency power quality to provide computer-grade power than the reserve generator 114 operating alone. As a fourth example, reliance on the reserve capacity provided by unit generators 106 via the wraparound bus 306 may be reserved for failovers of primary unit resources (e.g., the unit generator 106 and battery 110 for a unit 102), thus conserving fuel and operating expenses. These and other advantages are achievable in this exemplary scenario utilizing the techniques presented herein.

F. Computing Environment

Figure 7:
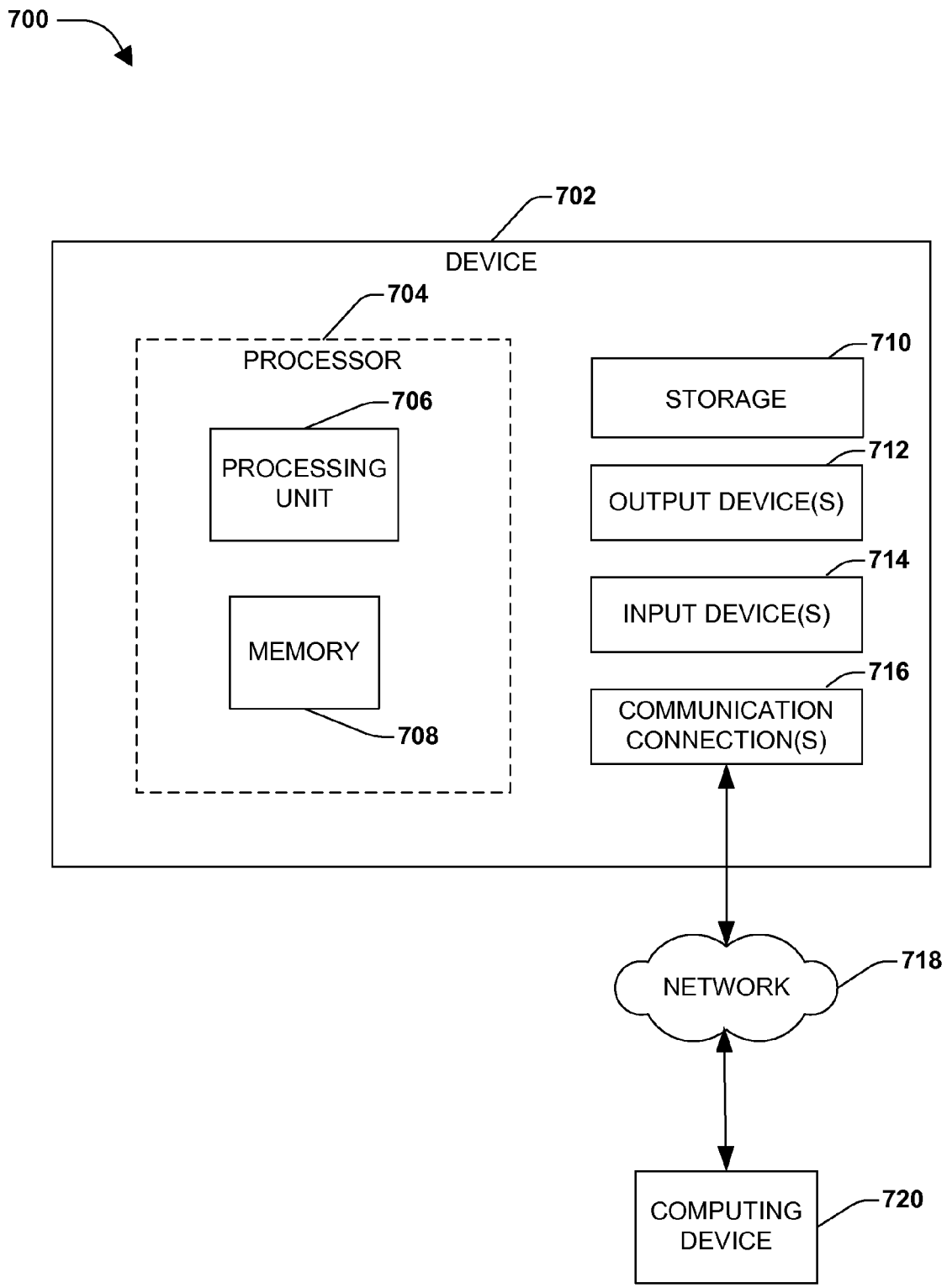
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 702 configured to implement one or more embodiments provided herein. In one configuration, computing device 702 includes at least one processing unit 706 and memory 708. Depending on the exact configuration and type of computing device, memory 708 may be volatile (such as RAM, for example), non-volatile (such as ROM, flash memory, etc., for example) or some combination of the two. This configuration is illustrated in FIG. 7 by dashed line 704.

In other embodiments, device 702 may include additional features and/or functionality. For example, device 702 may also include additional storage (e.g., removable and/or non-removable) including, but not limited to, magnetic storage, optical storage, and the like. Such additional storage is illustrated in FIG. 7 by storage 710. In one embodiment, computer readable instructions to implement one or more embodiments provided herein may be in storage 710. Storage 710 may also store other computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, but is not limited to, a modem, a Network Interface Card (NIC), an integrated network interface, a radio frequency transmitter/receiver, an infrared port, a USB connection, or other interfaces for connecting computing device 702 to other computing devices. Communication connection(s) 716 may include a wired connection or a wireless connection. Communication connection(s) 716 may transmit and/or receive communication media.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of computing device 702 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access computing device 720 and download a part or all of the computer readable instructions for execution. Alternatively, computing device 702 may download pieces of the computer readable instructions, as needed, or some instructions may be executed at computing device 702 and some at computing device 720.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A generator set providing power to at least two units, the generator set comprising:
    a reserve generator;
    a reserve bus connecting respective units to the reserve generator;
    a wraparound bus connecting the respective units to the reserve bus;
    for respective units:
        a utility line;
        a unit generator;
        a generator switch that:
            routes power to a unit load from the utility line, and
            responsive to detecting unit load exceeding power from the utility line, routes power to the unit load from the unit generator;
        a reserve switch that, responsive to detecting unit load exceeding power routed by the generator switch, routes power to the unit load from the reserve bus; and
        a wraparound controller that, when the unit has capacity exceeding the unit load, selectively connects the unit to the wraparound bus to supplement the power provided by the reserve generator to a second unit load.

2. The generator set of claim 1, the wraparound controller comprising: an operator panel comprising at least one operator switch that, when toggled by an operator, activates the wraparound controller for at least one unit generator.

3. The generator set of claim 1, the wraparound controller detects a reserve insufficiency comprising reserve load on the reserve bus exceeding power from the reserve generator; and
    responsive to the reserve bus monitor detecting the reserve insufficiency, selectively connects the unit generator to the wraparound bus to supplement the power provided by the reserve generator to satisfy the reserve insufficiency.

4. The generator set of claim 3:
    respective unit generators having a maximum load; and
    the wraparound controller selectively connects the unit to the wraparound bus to supplement the power provided by the reserve generator, wherein the power provided by the unit is within the maximum load of the unit generator.

5. The generator set of claim 1, comprising: a load bank that supplies variable load to the reserve bus.

6. The generator set of claim 5:
    respective unit generators having a minimum load; and
    the generator set comprising: a load bank controller that selects a variable load of the load bank to provide the minimum loads to respective unit generators.

7. The generator set of claim 5:
    the generator set that provides a failure tolerance of a specified number of unit failures of unit generators; and
    the load bank that selects a variable load not greater than the loads of the specified number of unit failures.

8. The generator set of claim 5, comprising: a load bank controller that, responsive to detecting a connection of at least one unit generator to the wraparound bus, reduces the variable load of the load bank.

9. The generator set of claim 1, respective unit generators capable of providing power to the wraparound bus with a step load of at least one additional unit.

10. The generator set of claim 1, respective units comprising: a battery connecting the generator switch and the reserve switch.

11. The generator set of claim 1, respective units comprising: at least one air handling unit that controls air flow within the unit.

12. The generator set of claim 11:
    respective units comprising a battery receiving power from the generator switch; and
    the at least one air handling unit comprising:
        a primary air handling unit connected to the battery; and
        an auxiliary air handling unit connected to the generator switch and not connected to the battery.

13. The method of claim 1, wherein the wraparound controller further selectively connects the unit to the wraparound bus when a reserve load on the reserve bus exceeds power from the reserve generator.

14. A method of controlling a generator set providing power to at least two units, the generator set comprising:
    a reserve generator;
    a reserve bus connecting respective units to the reserve generator;
    for respective units:
        a utility line;
        a unit generator; and
        a reserve switch that, responsive to detecting a unit load exceeding power from the utility line and the unit generator, routes power from the reserve bus; and
    a wraparound bus connecting respective unit generators to the reserve bus;
    and the method comprising:
        monitoring a reserve load on the reserve bus and power from the reserve generator; and
        responsive to detecting reserve load on the reserve bus exceeding power from the reserve generator:
            identifying a selected unit having spare capacity that exceeds power routed to a unit load of the selected unit; and
            selectively connecting the selected unit to the wraparound bus to supplement the power provided by the reserve generator for the reserve load.

15. The method of claim 14:
    respective unit generators having a maximum load; and
    selectively connecting the selected unit to the wraparound bus further comprising: selectively connecting the selected unit to the wraparound bus to supplement the power provided by the reserve generator, wherein the power provided by the unit is within the maximum load of the unit generator.

16. The method of claim 14:
    the generator set further comprising: a load bank that supplies variable load to the reserve bus; and
    the method further comprising: responsive to selectively connecting the selected unit to the wraparound bus, adjusting the variable load of the load bank.

17. The method of claim 16:
respective unit generators having a minimum load; and
adjusting the variable load of the load bank comprising:
selecting a variable load of the load bank to provide the minimum loads to respective unit generators.

18. The method of claim 16:
the generator set that provides a failure tolerance of a specified number of unit failures of unit generators; and
adjusting the variable load of the load bank comprising:
selecting a variable load of the load bank not greater than the loads of the specified number of unit failures.

19. The method of claim 16, adjusting the variable load of the load bank comprising: responsive to detecting a connection of at least one unit generator to the wraparound bus, reducing the variable load of the load bank.

20. A system for controlling a generator set providing power to at least two units, the generator set comprising:
a reserve generator;
a reserve bus connecting respective units to the reserve generator;
for respective units:
a utility line;
a unit generator; and
a reserve switch that, responsive to detecting unit load exceeding power from the utility line and the unit generator, routes power from the reserve bus; and
a wraparound bus connecting respective unit generators to the reserve bus,
the system comprising:
a reserve load monitor that monitors a reserve load on the reserve bus and power from the reserve generator; and
a wraparound bus connector that, responsive to detecting reserve load on the reserve bus exceeding power from the reserve generator:
identifies a selected unit having spare power capacity that exceeds a unit load of the selected unit; and
selectively connects the selected unit to the wraparound bus to supplement the power provided by the reserve generator for the reserve load.

* * * * *